United States Patent
Melendez Vazquez et al.

(10) Patent No.: US 12,139,023 B2
(45) Date of Patent: Nov. 12, 2024

(54) METHOD FOR ASCERTAINING A STATE OF AN ELECTRIC DRIVE OF A MEANS OF TRANSPORTATION

(71) Applicant: Robert Bosch GmbH, Stuttgart (DE)

(72) Inventors: Ivan Melendez Vazquez, Herrenberg (DE); Rolando Doelling, Hechingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 439 days.

(21) Appl. No.: 17/593,077

(22) PCT Filed: Mar. 4, 2020

(86) PCT No.: PCT/EP2020/055637
§ 371 (c)(1),
(2) Date: Sep. 8, 2021

(87) PCT Pub. No.: WO2020/182558
PCT Pub. Date: Sep. 17, 2020

(65) Prior Publication Data
US 2022/0153141 A1    May 19, 2022

(30) Foreign Application Priority Data

Mar. 12, 2019 (DE) .............. 10 2019 203 364.4
Mar. 20, 2019 (DE) .............. 10 2019 203 816.6

(51) Int. Cl.
*B60L 3/12*    (2006.01)
*G01D 21/00*   (2006.01)
*G08B 21/18*   (2006.01)

(52) U.S. Cl.
CPC .............. *B60L 3/12* (2013.01); *G01D 21/00* (2013.01); *B60L 2200/12* (2013.01);
(Continued)

(58) Field of Classification Search
CPC .... B60L 3/12; B60L 2200/12; B60L 2240/12; B60L 2240/14; B60L 2250/00; G01D 21/00; G08B 21/182
(Continued)

(56) References Cited

U.S. PATENT DOCUMENTS

2014/0229054 A1* 8/2014 Gerundt .................. B62J 50/22
701/29.4

FOREIGN PATENT DOCUMENTS

DE        69433735 T2      9/2004
DE   102011077181 A1     12/2012
(Continued)

OTHER PUBLICATIONS

Moises Diaz, Stability-based system for bearing fault early detection, Aug. 2017, Elsevier, Expert Systems With Applications 79 (Year: 2017).*
(Continued)

*Primary Examiner* — Elaine Gort
*Assistant Examiner* — Matthias S Weisfeld
(74) *Attorney, Agent, or Firm* — NORTON ROSE FULBRIGHT US LLP; Gerard A. Messina

(57) ABSTRACT

A method for ascertaining a state of an electric drive of a transportation device, in particular a bicycle. The method includes: providing sensor data from sensors of the drive, the sensor data indicating parameters of the drive if an instantaneous operating range of the drive and/or of the transportation device corresponds to a predefined operating range; storing such sensor data, as measuring sensor signals, which
(Continued)

originate from sensors predefined for the predefined operating range; and recognizing a defect of the drive if at least one of the measuring sensor signals deviates from a predefined standard sensor signal by a predefined degree; as well as outputting a warning about the presence of the defect to a user of the transportation device.

16 Claims, 6 Drawing Sheets

(52) U.S. Cl.
CPC ....... *B60L 2240/12* (2013.01); *B60L 2240/14* (2013.01); *B60L 2250/00* (2013.01); *G08B 21/182* (2013.01)

(58) Field of Classification Search
USPC .......................................................... 701/22
See application file for complete search history.

(56) References Cited

FOREIGN PATENT DOCUMENTS

| DE | 102013226143 | * | 3/2015 |
| DE | 102013226143 | B3 | 3/2015 |
| DE | 102014212760 | A1 | 3/2015 |
| DE | 102017220245 | A1 | 5/2019 |
| EP | 0635423 | * | 1/1995 |
| EP | 0635423 | A1 * | 1/1995 |
| EP | 2718065 | A1 | 4/2014 |
| WO | 2012167987 | A1 | 12/2012 |

OTHER PUBLICATIONS

Paretti, Robust harmonic detection, classification and compensation method for electric drives based on the sparse fast Fourier transform and the Mahalanobis distance, Mar. 23, 2017, IET Journals, The Institution of Engineering and Technology (Year: 2017).*

Okoh, Overview of Remaining Useful Life Prediction Techniques in Through-Life Engineering Services, 2014, Product Services Systems and Value Creation. Proceedings of the 6th CIRP Conference on Industrial Product-Service Systems, Elsevier (Year: 2014).*

Coble, Merging Data Sources to Predict Remaining Useful Life—An Automated Method to Identify Prognostic Parameters, 2010, University of Tennessee, Knoxville, TRACE: Tennessee Research and Creative Exchange (Year: 2010).*

Diaz, Stability-based system for bearing fault early detection, Aug. 2017, Elsevier, Expert Systems With Applications 79 (Year: 2017).*

International Search Report for PCT/EP2020/055637, Issued Jun. 2, 2020.

Guyon et al., "Gene Selection for Cancer Classification Using Support Vector Machines," Machine Learning, vol. 46, 2002, 389-422. <https://link.springer.com/content/pdf/10.1023/A:1012487302797.pdf> Downloaded Sep. 8, 2021.

Mahalanobis Distance, Wikipedia, pp. 1-5. <https://en.wikipedia.org/wiki/Mahalanobis_distance> Downloaded Sep. 8, 2021.

* cited by examiner

METHOD FOR ASCERTAINING A STATE OF AN ELECTRIC DRIVE OF A MEANS OF TRANSPORTATION

BACKGROUND INFORMATION

The present invention relates to a method for ascertaining a state of an electric drive. The electric drive is, in particular, part of a means of transportation, preferably a bicycle. The present invention also relates to a computer program for carrying out the method and a data memory for storing the computer program and the sensor data used. Finally, the present invention relates to a means of transportation, in particular a bicycle.

Means of transportation are known from the related art, which are designed as bicycles, which include an electric motor as the drive unit. Such means of transportation are also known as pedelecs. It is further known that maintenance activities for pedelecs are planned according to a "preventive maintenance methodology." This means that the users of the pedelec are to carry out, or have carried out, recommended measures for maintaining the pedelec after a predetermined distance traveled.

Approaches to a "predictive maintenance methodology" are also known to the related art, in particular in the field of automotive engineering or aircraft engineering. In this approach, system states are inferred based on large quantities of available data.

SUMMARY OF THE INVENTION

The method according to the present invention enables an improvement in the efficiency of the maintenance of the drive. In contrast to the related art, the maintenance may thus be dispensed with if the drive does not show any anomalies. The failure of the drive within the maintenance interval, due to an undetected defect, is also prevented. The drive is thus preferably always in an operation-ready state, the user of the drive receiving a prompt for maintenance only when this is necessary. An approach of predictive maintenance is thus followed. The method may be carried out with little complexity and requires only a small amount of energy to be carried out, so that the method may be optimally used for application in control units of mobile drives, in particular of bicycles.

External disturbances occur in a bicycle, such as noises, ambient temperature influences, ground unevennesses, riding profile of the user, weight of the user or the like. The method according to the present invention minimizes the influence of disturbances of this type to avoid false alarms.

The method for ascertaining a state of an electric drive of a means of transportation, in particular a bicycle, includes the following steps: A provision of sensor data from sensors of the drive initially takes place. The sensor data indicate parameters of the drive. In particular, only sensors are used which are necessary in any case for operating the drive. If an instantaneous operating range of the drive and/or of the means of transportation corresponds to a predefined operating range, a storage of sensor data takes place. These sensor data are stored as measuring sensor data if the sensor data originate from sensors predefined for the predefined operating range. In this way, only those sensor signals are considered, which may be expected to reliably indicate an anomaly of the drive. For example, it may be difficult to detect bearing faults with the aid of increasing torque, so that a torque upper limit is provided for this purpose as the operating range. A recognition of a defect of the drive then takes place if at least one of the measuring sensor signals deviates from a predefined standard sensor signal. The deviation must take place by at least a predefined degree to be able to reliably recognize a defect of the drive. The standard sensor signal is provided, in particular, by recording the sensor data for a drive without defects and preferably stored in a control unit. Finally, an outputting of a warning about the presence of the defect takes place to a user of the means of transportation. This may take place acoustically and/or graphically and/or haptically.

This makes it possible, in particular, to take sensor data into account only if an instantaneous operating range of the drive results in the expectation that these sensor data may reliably indicate a defect. If this is not the case, no storage of the sensor data, in particular, takes place. A complexity in carrying out the method is minimized thereby.

The aforementioned steps are preferably carried out repeatedly, at least once every 60 minutes. It may thus be ensured that defects may be recognized as such at an early point.

The subclaims show preferred refinements of the present invention.

As described above, a comparison of a standard sensor signal and a measuring sensor signal preferably takes place to recognize whether a defect is present. It is preferably provided that a calculation of a state parameter of the drive takes place from a deviation between the measuring sensor signal and the standard sensor signal. This state parameter represents a state of the drive and thus is a measure of a deviation of the state of the drive from a normal state. A defect is recognized if the state parameter exceeds a limiting value corresponding to the predefined degree. In this way, measuring sensor signals and standard sensor signals may be handled in a simplified manner, in particular compared.

A step of classifying the measuring sensor signal preferably takes place based on at least one predefined statistical code number. The measuring sensor signal may thus be converted into a statistical value. A storage of the measuring sensor signal is then no longer necessary. Instead, the memory space may be released to thereby minimize the necessary memory space required. The calculation of the state parameter particularly advantageously takes place based on the Mahalanobis distance between the statistical code number of the measuring sensor signal and the same statistical code number of the standard sensor signal. The method is thus easy and of little complexity, while simultaneously being able to be reliably carried out.

The predefined statistical code number is particularly advantageously a mean value and/or a standard deviation and/or a skewness and/or a kurtosis and/or a form parameter. These code numbers may be easily calculated from the sensor data.

In one advantageous refinement, an estimate of a remaining useful life of the drive also takes place. The remaining useful life indicates how long the drive may be operated until a failure. The estimate takes place by extrapolating a time profile of the state parameter, based on predefined degradation curves. The degradation curves indicate by modeling what effect a beginning defect will have, so that the remaining useful life may be estimated therefrom. The degradation curves have been obtained in advance, in particular by recording the sensor data of a defective drive up to complete failure and stored in a control unit.

It is preferably provided that the outputting step takes place only if it is recognized in an inquiry step that the remaining useful life is less than a predefined limiting value. Due to this additional check, it is established whether a defect is present, but this defect does not directly entail the risk of a failure. In this case, an output is dispensed with.

The predefined operating range and/or the predefined statistical code number are advantageously determined in advance by collecting test sensor data. The test sensor data have been detected with the aid of sensors at at least one defective drive, in particular at multiple defective drives, so that the test sensor data represent sensor data which occur if the drive is defective. Test sensor data which enable a maximal classification accuracy of the defect of the drive are used as the predefined operating range and/or the predefined statistical code number. In this way, in particular, a reduction of the sensors takes place, which are to be monitored during the operation of the drive to reliably recognize a defect of the drive.

The predefined operating range and/or the predefined statistical code number is/are preferably different for different defects of the drive. As a result, the predefined operating range and/or the predefined statistical code number has/have been determined separately for different defects. This makes it possible to distinguish between different error patterns of the drive, so that it is possible, in particular, to make an accurate estimate of how long the drive may continue to be used until a complete failure.

It is furthermore preferably provided that each standard sensor signal has been ascertained in advance at at least one defect-free drive with the aid of the predefined sensors in the predefined operating range. It may thus be checked whether and to what degree the measuring sensor signal deviates from the standard sensor signal, which allows a state of the drive to be inferred. In particular, a defect may be inferred if the measuring sensor signal deviates from the standard sensor signal by more than a predefined degree. The standard sensor signal is particularly advantageously ascertained, based on a multiplicity of defect-free drives.

The described method may be particularly advantageously used to detect bearing damage and/or transmission damage. It is therefore preferably provided that the defect of the drive, which is recognized in the recognition step described above, is a bearing damage and/or a transmission damage. Bearing damage and/or transmission damage may be safely and reliably recognized, it being possible, in particular, to give the user an indication of how long the drive may probably continue to be used until a failure.

The predefined sensors are, in particular, exclusively such sensors which are necessary for controlling the drive. In particular, no additional sensors are to be attached. Instead, sensors already present in the drive may be particularly advantageously used. The predefined sensors preferably include at least one current sensor for detecting an electrical phase current of the drive and/or a voltage sensor for detecting an electrical phase voltage of the drive and/or a temperature sensor of the drive and/or an acceleration sensor and/or speed sensors and/or a cadence sensor for detecting a cadence of a user of the means of transportation and/or a torque sensor for detecting a torque exerted by the user of the means of transportation.

In particular, the voltage sensor may also be a microcontroller, which calculates the electrical phase voltage, for example for regulating the drive.

The present invention furthermore relates to a computer program. The computer program is configured to carry out the method as described above. The computer program therefore imposes minimal requirements on the computing power and memory. The computer program may therefore be used in a means of transportation easily and with little complexity, in particular in a bicycle. In applications of this type, only limited resources are usually available.

The present invention likewise relates to a machine-readable memory medium. The computer program is stored on the memory medium. The memory medium may be, in particular, a flash memory or a magnetic memory. The memory medium is particularly advantageously part of a microcontroller of a bicycle which includes an electric drive. The sensor data used are preferably also stored in the microcontroller of the bicycle. Due to the method described above, the data quantity to be stored is minimized, so that the storage is preferably possible in a memory module having a limited capacity, as is the case, for example, in a microcontroller. It is also possible to insert an additional memory medium, for example an additional microcontroller. The sensor data may be advantageously also stored in a cloud.

Finally, the present invention relates to a bicycle, which includes an electric drive. A propulsion of the bicycle is supported by the drive in that a driving force generated by the muscle power of a user is amplified. The drive includes a control unit. The control unit is used to execute the computer program, as described above. Alternatively or additionally, the control unit is designed to carry out a method as described above. A terrain recognition and exclusion of the sensor data obtained in the meantime is particularly advantageous. Corrupted sensor data may thus remain unconsidered.

A sampling of the measuring sensor signal particularly advantageously takes place with a sampling time of 10 ms. An optimal compromise is thus achieved between an accurate sampling, on the one hand, and a minor memory demand, on the other hand.

BRIEF DESCRIPTION OF THE DRAWINGS

Exemplary embodiments of the present invention are described in detail below with reference to the accompanying drawing.

DETAILED DESCRIPTION OF THE INVENTION

Figure 1:
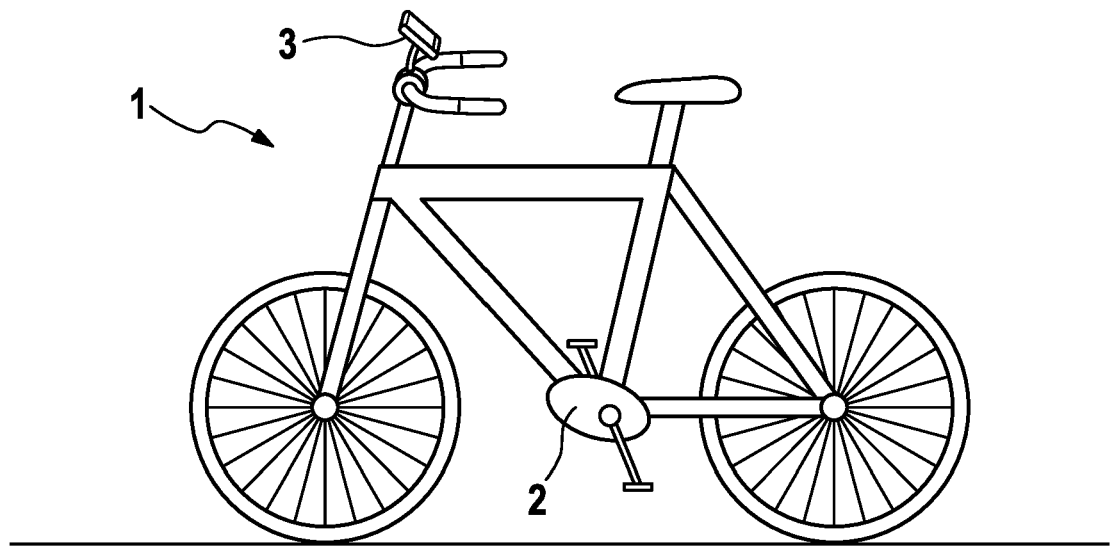
FIG. 1 shows a schematic illustration of a bicycle according to one exemplary embodiment of the present invention.

FIG. 1 schematically shows a bicycle 1 according to one exemplary embodiment of the present invention. Bicycle 1 includes a drive 2 and a display 3. Drive 2 is, in particular, an electric motor and is used to support a muscle power exerted by a user of bicycle 1.

Figure 2:
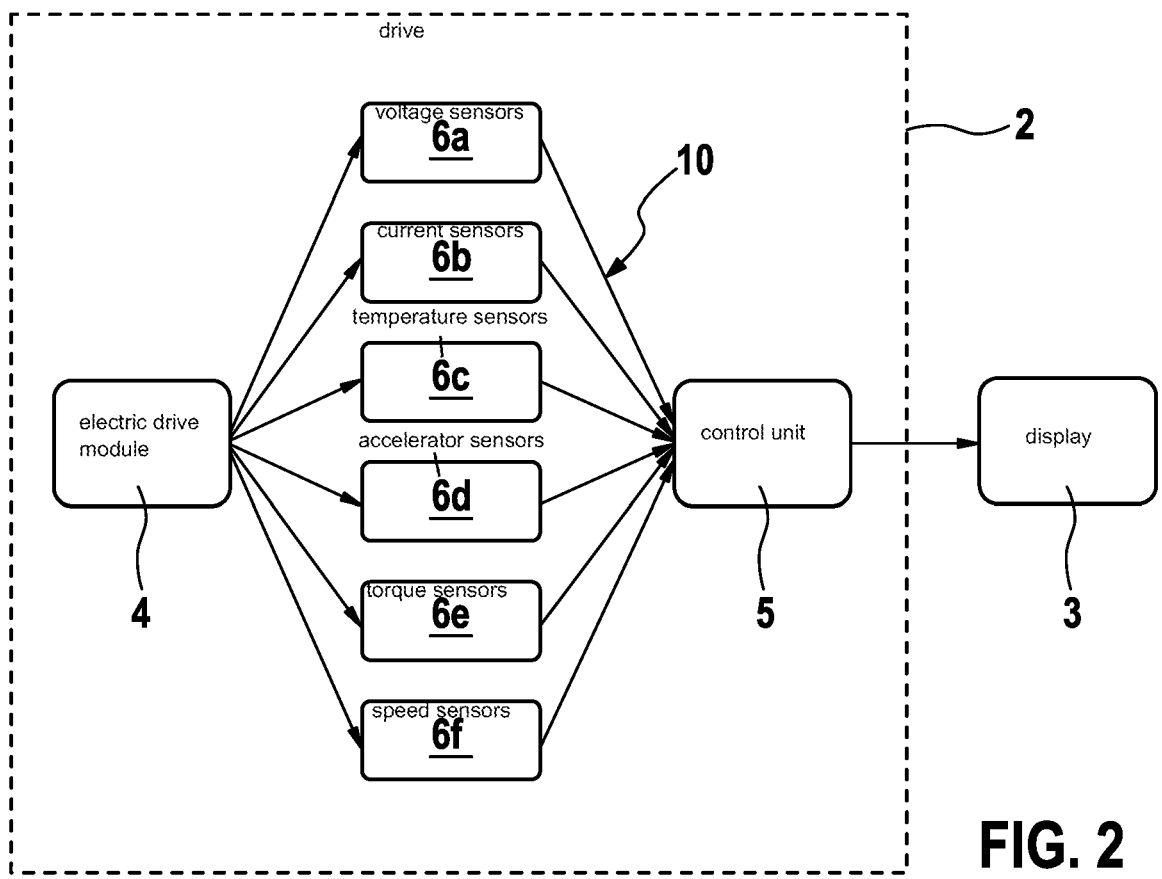
FIG. 2 shows a schematic illustration of the interplay of individual components of the bicycle according to the exemplary embodiment of the present invention.

FIG. 2 schematically shows the interplay of different components of bicycle 1. Drive 2 thus includes an electric drive module 4. This electric drive module 4 preferably includes a transmission. Electric drive module 4 may be monitored by a multiplicity of sensors 6, voltage sensors 6a and/or current sensors 6b and/or temperature sensors 6c and/or acceleration sensors 6d and/or torque sensors 6e and/or speed sensors 6f particularly preferably being provided. Sensor data of these sensors 6 may be read out and further processed via a control unit 5, which is explained, in particular, with reference to FIG. 3. Should an anomaly of drive 2 be present, based on the sensor data, control unit 5 may output a notification to the user via display 3 that a maintenance should be carried out. The methods used for this purpose are adapted, in particular, to control unit 5 and require little memory space and little computing power.

Figure 3:
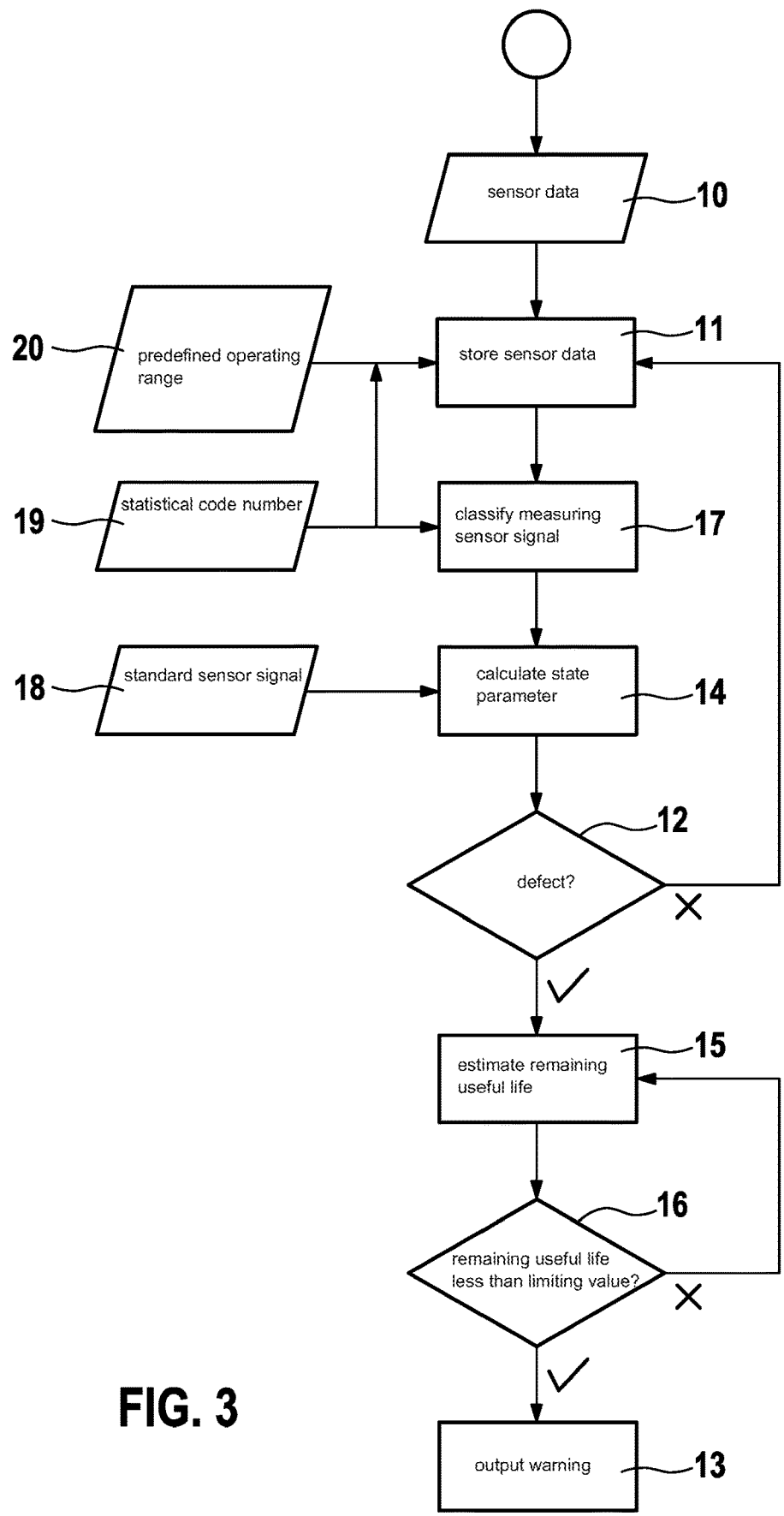
FIG. 3 shows a schematic view of a method according to one exemplary embodiment of the present invention.

FIG. 3 schematically shows a flowchart of a method according to one exemplary embodiment of the present invention. This method is carried out, in particular, in control unit 5 and is used to ascertain a state of drive 2. One advantage of this method is the use of information which is supplied by sensors 6 present in drive 2. In addition, most relevant sensors 6 and the operating range of drive 2, which include the identifiability of a defect, are established with the aid of an offline analysis, which is explained below with reference to FIG. 7 and FIG. 3. The amount of memory space required by control unit 5 is minimized thereby. A reliable recognition of defects is thus made possible, little computing power being necessary for carrying out the method. In contrast to other approaches, which concentrate on stationary systems which are always in operation under the same conditions, for example in the test bay, the method uses the differentiation of operating ranges. In particular, operating conditions in a bicycle in use are not reproducible as in a laboratory.

Sensor data 10 of sensors 6 are therefore provided. However, a storage 11 of sensor data 10 takes place only if an instantaneous operating range of drive 2 and/or of the means of transportation corresponds to a predefined operating range 20. However, only sensor data 11 which originate from sensors 6 predefined for predefined operating range 20 are stored as measuring sensor signals.

A recognition 12 of a defect takes place as a further relevant step. To simplify this step, a classification 17 of the measuring sensor signal as well as a calculation 14 of a state parameter 200 of drive 2 also take place. Classification 17 of the measuring sensor signal takes place based on at least one predefined statistical code number 19. The predefined statistical code number is, in particular, a mean value and/or a standard deviation and/or a skewness and/or a kurtosis and/or a form parameter. As a result, the measuring sensor signals themselves are not to be further stored, but instead they are converted into statistical code numbers. The memory demand required may thus be reduced. The further processing then takes place based on the statistical code numbers of the measuring sensor signals and not based on the raw data of the measuring sensor signals themselves.

Calculation 14 of state parameter 200 of drive 2 takes place based on a deviation between the measuring sensor signal and a predefined standard sensor signal 18. State parameter 200 is thus a measure of a deviation of the state of drive 2 from a normal state. If the deviation is large, this points to a presence of a defect. Calculation 14 of state parameter 200 particularly advantageously takes place based on the Mahalanobis distance between statistical code number 19 of the measuring sensor signal and the same statistical code number of standard sensor signal 18.

A defect is recognized if at least one of the measuring sensor signals deviates from a standard sensor signal by a predefined degree. This means that state parameter 200, which represents the deviation between the measuring sensor signal and standard sensor signal 18, must exceed a predefined limiting value to recognize a defect. The limiting value then corresponds to the predefined degree of the deviation described above between standard sensor signal 18 and the measuring sensor signal. The preceding ascertainment of standard sensor signal 18 is described below with reference to FIG. 7 and FIG. 3.

If the step of recognizing 12 a defect is not positive, i.e., if no defect is present, the steps of storing 11, classifying 17 and calculating 14 state parameter 200 are carried out again. In particular, new sensor data are present for carrying out these steps again, since a certain amount of time has elapsed while the aforementioned steps were carried out the first time. It is also possible that a predetermined offset time period is awaited prior to again carrying out the aforementioned steps.

The sensor data may be filtered prior to or during the steps of storage 11 or classification 17 for the purpose of noise suppression. This simplifies the calculation of state parameter 200 and increases the accuracy of the statement of state parameter 200.

Figure 4:
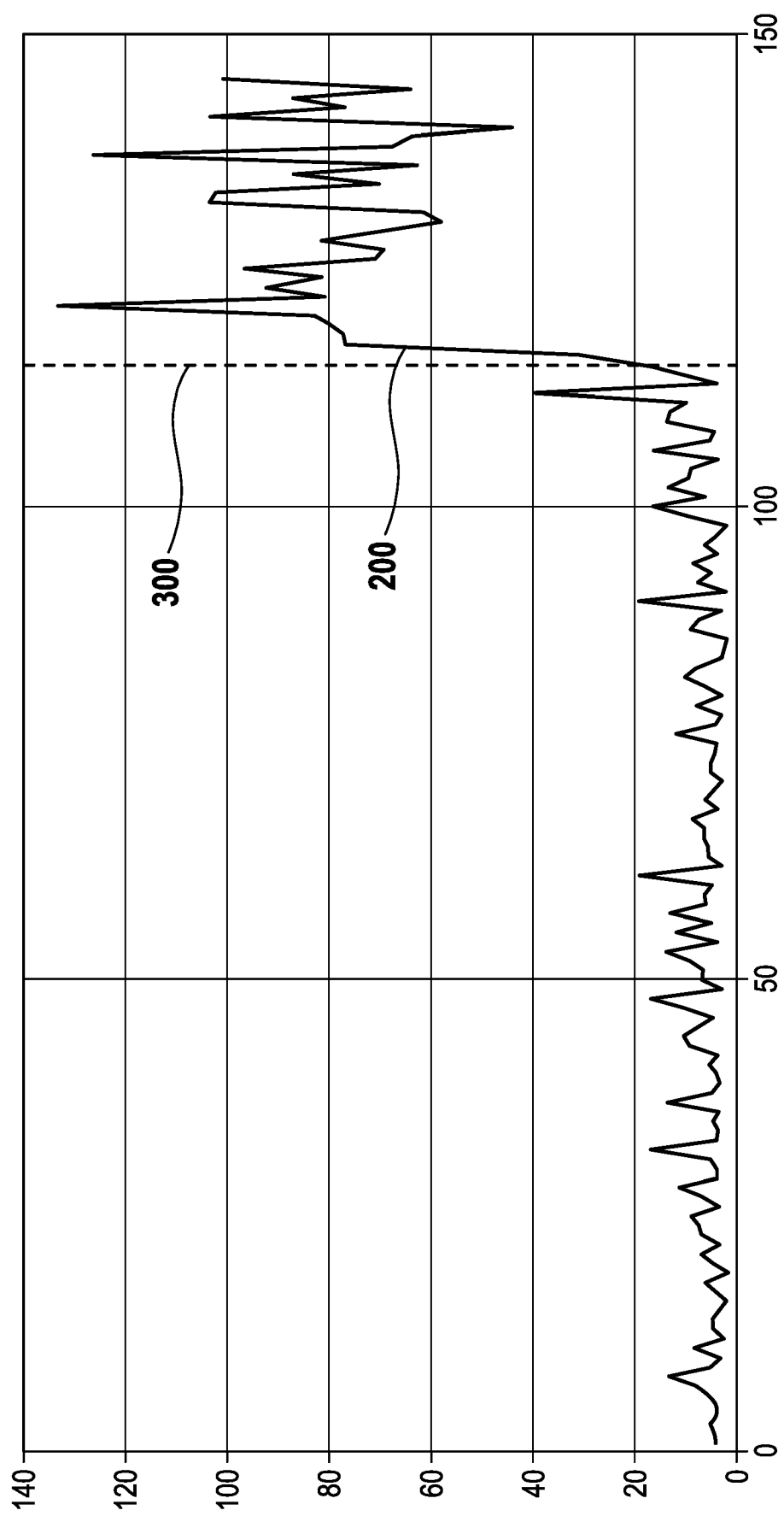
FIG. 4 shows a schematic view of a state parameter generated with the aid of the method according to the exemplary embodiment of the present invention.

FIG. 4 schematically shows a diagram, in which the ordinate represents the size of state parameter 200 and the abscissa represents a number of the measurement, in which state parameter 200 was determined. On the left side of sample limit 300, it is shown, for example, that state parameter 200 is close to zero in an intact drive 2. Larger values for state parameter 200 are shown to the right of sample limit 300, as is the case if drive 2 has a defect. The defect is thus easily and reliably recognizable, based on state parameter 200.

Figure 5:
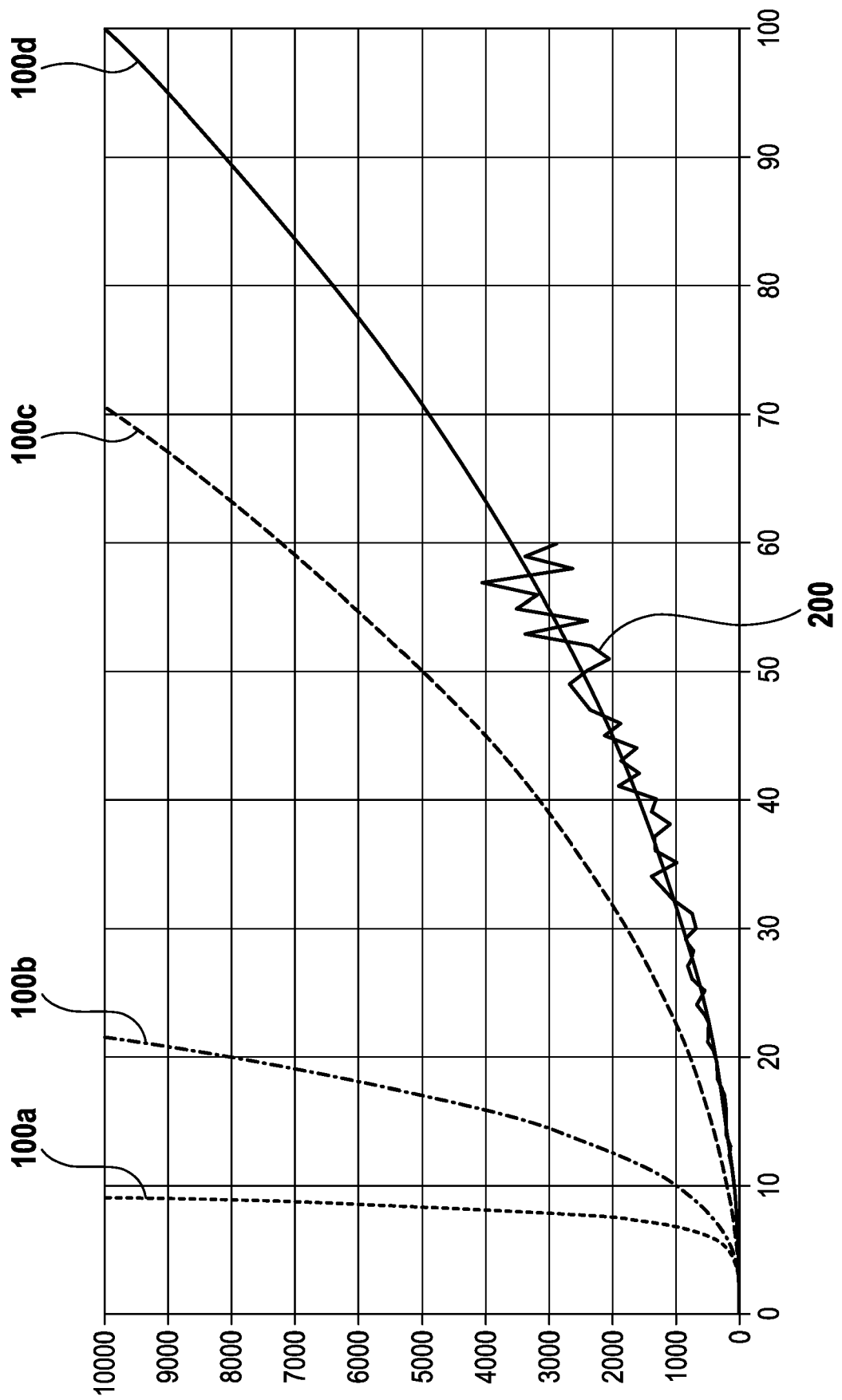
FIG. 5 shows a schematic view of a sequence of a remaining useful life estimate of the method according to the exemplary embodiment of the present invention.

If a defect was recognized, a step of estimating 15 a remaining useful life of drive 2 is preferably carried out. The method makes a distinction, in particular, based on different predefined operating states 20 and/or predefined statistical code numbers 19 and/or predefined standard sensor signals 18. The remaining useful life indicates a time period, in which drive 2 may be operated until a complete failure. The estimation takes place by extrapolating a time profile of state parameter 200, based on predefined degradation curves 100. This is illustrated schematically in FIG. 5. Every defect thus causes a different degradation of the state of the drive. In some defects, the failure occurs after only a few cycles, in others drive 2 may remain in operation for a longer time prior to the failure. FIG. 5 shows examples of different degradation curves 100, a first degradation curve 100a resulting the fastest in a deterioration of the state and thus in a failure, while a second degradation curve 100b and a third degradation curve 100c show a slower degradation of the state, and fourth degradation curve 100d shows a slowest degradation of the state. To estimate 15 the remaining useful life, the information from degradation curve 100 is used, which runs similarly to the previous profile of state parameter 200.

In the example illustrated in FIG. 5, the ordinate shows a size of state parameter 200, and the abscissa shows a number of cycles. In particular, FIG. 5 is thus similar to FIG. 4, but the abscissa represents a greater range, due to a different parameterization. It is shown that state parameter 200 was previously observed up to cycle 60. State parameter 200 follows fourth degradation curve 100d. If 10000 is predefined as the limit for a failure, drive 2 could be in operation for a total of 40 additional cycles before the risk of a failure is very high. However, if the state parameter were to follow third degradation curve 100c, it would be predicted that drive 2 could be in operation for only 10 more cycles.

An inquiry step 16 is therefore carried out, due to which it is recognized whether the remaining useful life is less than a predefined limiting value. The predefined limiting value is dependent on the aforementioned limit, at which a failure may be expected with a high degree of probability. If this limiting value is exceeded, inquiry step 16 is positively ended, and an output 13 of a warning about the presence of the defect takes place to a user of bicycle 1. In particular, the user is prompted to carry out a maintenance or have one carried out. Should inquiry step 16 be negative, the remaining useful life is recalculated, an updated value of the state parameter being used.

Different defects may thus be simultaneously carried out easily and with little complexity, but reliably at the same time. Which remaining useful life results from the defect may also be reliably estimated. An optimal point in time for carrying out a maintenance of drive 2 and/or bicycle 1 may thus be recommended.

Figure 6:
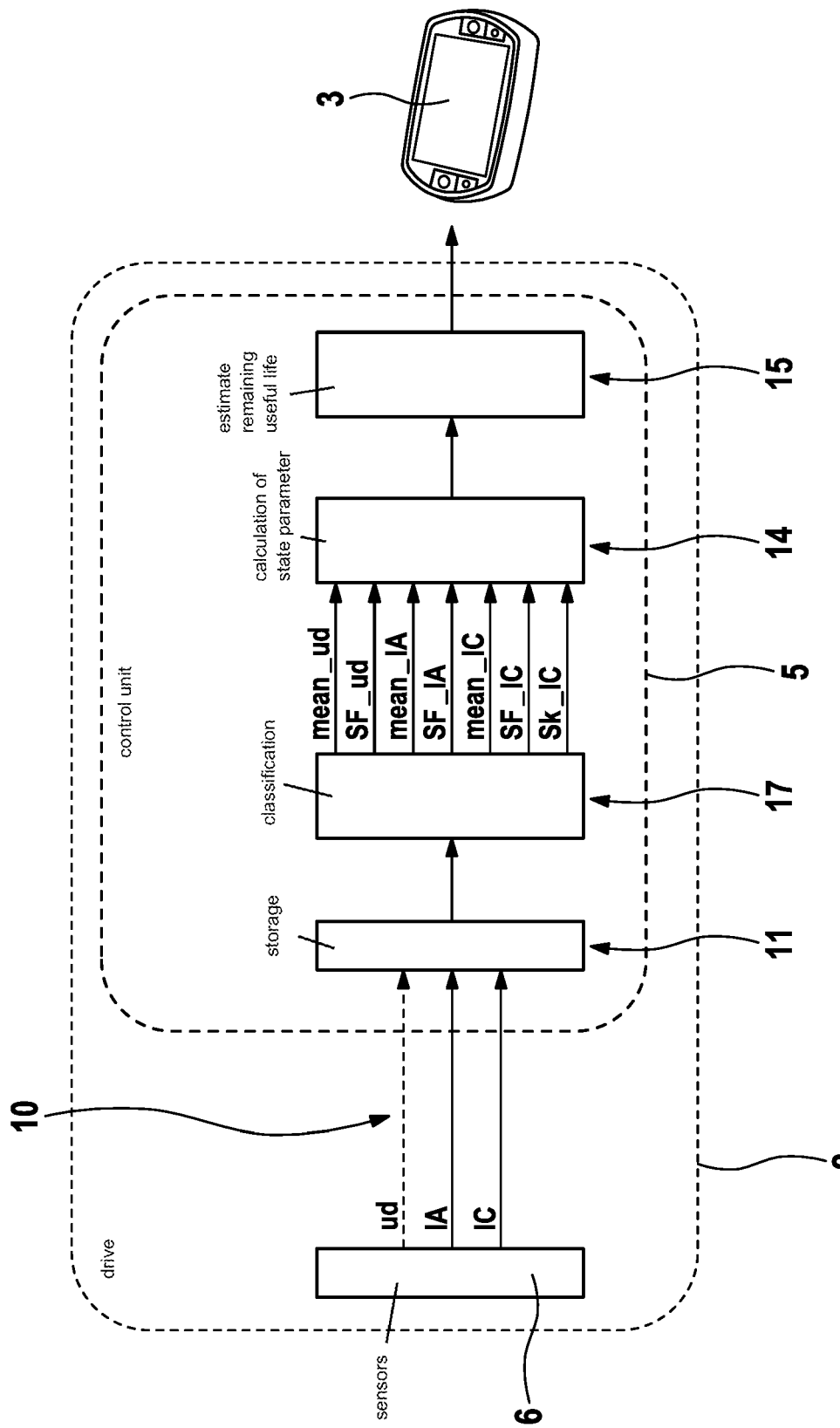
FIG. 6 shows a schematic view of an example of a sequence of the method according to the exemplary embodiment of the present invention.
Figure 7:
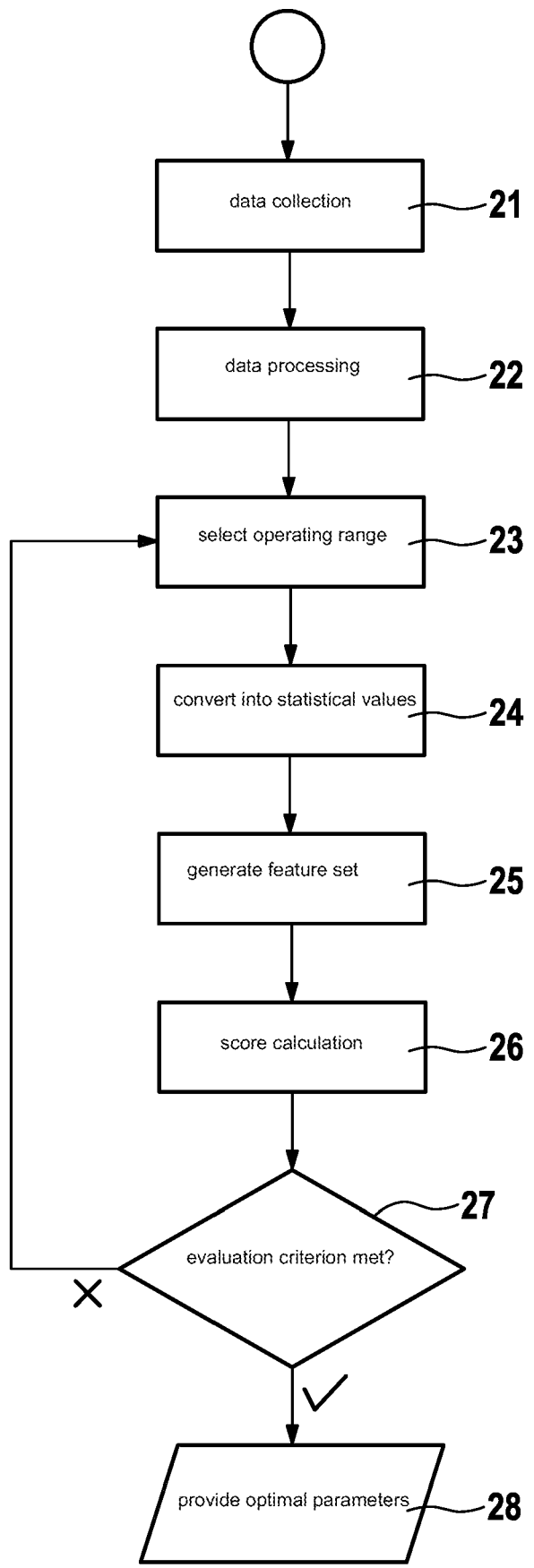
FIG. 7 shows a schematic flowchart of a method for ascertaining framework conditions for the method according to the exemplary embodiment of the present invention.

FIG. 6 shows a schematic view of an example of a sequence of the method according to the exemplary embodiment of the present invention. In this example, drive 2 has a damaged bearing. Seven features have been identified in advance, as shown in FIGS. 7 and 8. These features are a mean value mean_ud of a voltage ud, a form parameter SF_ud of voltage ud, a mean value mean_IA of a motor phase current IA, SF_IA, a mean value mean IC of a motor phase current IC, a form parameter SF_IC of motor phase current IC, as well as a skewness Sk_IC of motor phase current IC. These features are ascertained as predefined statistical code numbers 19, which thus permit a reliable error identification. To generate these features, three sensor signals 10 are required, motor phase current IA and motor phase current IC as well as voltage ud. Motor phase currents IA and IC may be detected based on sensors 6, voltage ud is, in particular, a parameter of a controller of drive 2 and is preferably calculated in control unit 5. These three sensor signals 10 are stored in control unit 5 by a module for carrying out the step of storage 11.

Sensor data 10 remain stored for a predefined period, 15 seconds in this example. These raw data of sensor data 10 are then converted into statistical values by a module for carrying out the step of classification 17 and subsequently deleted from the memory, so that only the statistical values of the sensor data remain in control unit 5. A provision of state parameter 200 takes place by a module for carrying out calculation 14, based on which a deviation of the statistical values compared to the normal state is identified. The reference values for comparison with the normal state originate from measuring signals of drives 2 without defects. For example, five different drives 2 are taken into account as a reference. However, the number of drives 2, from which the reference values may be obtained, may be arbitrarily increased to thereby average different behaviors of the drives, due to manufacturing tolerances.

The state parameter is also used by a module for carrying out the step of estimating 15 the remaining useful life. If the remaining useful life is lower than a predefined value, a message is output via display 3, including the remark that bicycle 1 is to be maintained.

During a travel in off-road terrain, high vibrations may be transferred to drive 2, which, in turn, may corrupt the meaningfulness of state parameter 200. It is therefore preferably provided that a possibility for recognizing states of this type exists, based on a function for terrain recognition. If there is an off-road travel which permits no or only a limited statement about a defect of drive 2, it is therefore provided that sensor data 10 are not stored, i.e., that the step of storage 11 is dispensed with, the subsequent steps not being carried out.

FIGS. 7 and 8 show an offline method. The goal of the offline method is to find the parameters which make it possible to reliably recognize defects as well as, in particular, to also separate them from the error patterns. As described above, this makes it possible for only the most relevant sensor data to be stored. As a result, the use of the method illustrated in FIG. 3 is possible in control unit 5 having a limited memory space, so that a microcontroller, for example, may be used as control unit 5. The parameters to be determined in the offline method are, in particular, predefined operating range 20 used in the method according to FIG. 3 and/or predefined statistical code numbers 19 used in the method according to FIG. 3. The identification of defects is most clearly made possible with the aid of these parameters. For example, it is possible to detect a bearing failure at a low motor torque. At higher torques, however, the sensor data of drives 2 with and without a bearing failure have a similar behavior, which prevents the identification of the error or makes it more difficult. In addition, the optimal number of features, i.e., the number of statistical code numbers 19, and in particular also a duration of a measurement, are to be determined. The smaller all these parameters are, the less memory space is required in control unit 5.

The first step in the offline analysis is data collection 21 as well as data processing 22, a multiplicity of sensor data being collected based on tests using reference drives 2 and patterns. Reference drives 2 and patterns are provided with particular defects. Drives 2 of a bicycle usually have the following sensors available: current sensors, acceleration sensors, speed sensors, cadence sensors, temperature sensors and user torque sensors. Data collection 21 is carried out, based on these sensors. No further sensors are preferably additionally attached. In addition, it is possible to monitor the rotational speed and torque of electric drive module 4 and the voltage and current of an energy store.

A selection 23 of an operating range of drive 2 then takes place, for which an analysis is to be carried out. A conversion 24 into statistical values takes place thereafter, as was already described above. All statistical values are calculated, which were able to be used as predefined statistical code numbers 19 for the method shown in FIG. 3. A set of potential relevant characteristics is thus present, the characteristics relevant for the selected operating range being selected in a subsequent step. For this purpose, a feature set generation 25 takes place, with the aid of which a set of relevant features is generated. Feature set generation 25 may be carried out manually, but it particularly advantageously takes place based on the "SVM-RFE" algorithm using the simulated annealing optimization method, which also supplies the accuracy of the selected features. This algorithm is described in Guyon, I., Weston, J., Barnhill, S., & Vapnik, V. (2002). Gene Selection for Cancer Classification Using Support Vector Machines. Machine Learning 46 (1-3), 389-422.

For example, a range having more than a hundred potentially relevant characteristics may be used as the origin, so that a manual selection of predefined statistical characteristics 19 used for the method according to FIG. 3 would be very time-consuming. The SVM-RFE algorithm including simulated annealing optimization is therefore used to speed up this process.

A score calculation 26 is subsequently carried out, in which a score is calculated, which takes into account the classification accuracy of the set and the data variable. The obtained set may thus be classified.

In a checking step 27, it is checked whether an evaluation criterion has been met. If the evaluation criterion has not been met, a new operating range is selected, whereby an iteration results. The steps of selection 23, conversion 24, feature set generation 25 and score calculation 26 continue to be carried out until the evaluation criterion has been met. The evaluation criterion includes, in particular, a minimum score and/or a number of iteration steps. If the evaluation criterion has been met, the offline method provides optimal parameters 28, which contain predefined operating range 20 used in the method according to FIG. 3 and predefined statistical characteristics 19.

What is claimed is:

1. A method for ascertaining a state of an electric drive of a transportation device, the method comprising:
   providing sensor data from sensors of the drive, the sensor data indicating parameters of the drive;
   storing, when an instantaneous operating range of the drive and/or of the transportation device, corresponds to a predefined operating range, the sensor data as measuring sensor signals, which originate from sensors predefined for the predefined operating range;
   recognizing a defect of the drive when at least one of the measuring sensor signals deviates from a predefined standard sensor signal by a predefined degree;
   outputting a warning about a presence of the defect to a user of the transportation device; and
   classifying the measuring sensor signal, based on at least one predefined statistical code number;
   wherein a calculation of a state parameter of the drive corresponds to a distance between the at least one predefined statistical code number of the measuring sensor signals and the same statistical code number of the standard sensor signal, and
   wherein the distance is a Mahalanobis distance.

2. The method as recited in claim 1, wherein the transportation device is a bicycle.

3. The method as recited in claim 1, further comprising:
   calculating a state parameter of the drive from a deviation between the measuring sensor signal and the standard sensor signal, the state parameter being a measure of a deviation of the state of the drive from a normal state;
   wherein the defect is recognized in the recognizing step when the state parameter exceeds a limiting value corresponding to the predefined degree.

4. The method as recited in claim 3, further comprising:
   estimating a remaining useful life of the drive up to a failure of the drive, by extrapolating a time profile of the state parameter, based on predefined degradation curves.

5. The method as recited in claim 4, wherein the outputting step takes place only when it is recognized, by an inquiry step, that the remaining useful life is less than a predefined limiting value.

6. The method as recited in claim 1, wherein each standard sensor signal is ascertained in advance on at least one defect-free drive using the predefined sensors in the predefined operating range.

7. The method as recited in claim 1, wherein the defect of the drive, which is recognized in the recognizing step, is a bearing damage and/or a transmission damage.

8. The method as recited in claim 1, wherein the predefined sensors include at least one of the following:
   a current sensor configured to detect an electrical phase current of the drive; and/or
   a voltage sensor configured to detect an electrical phase voltage of the drive; and/or
   a temperature sensor of the drive; and/or
   an acceleration sensor; and/or
   a speed sensor; and/or
   a cadence sensor configured to detect a cadence of a user of the means of transportation; and/or
   a torque sensor configured to detect a torque exerted by the user of the transportation device; and
   wherein the predefined sensors are exclusively sensors that are used to control the drive.

9. The method as recited in claim 1,
   wherein the state parameter is a measure of a deviation of the state of the drive from a normal state.

10. A method for ascertaining a state of an electric drive of a transportation device, the method comprising:
    providing sensor data from sensors of the drive, the sensor data indicating parameters of the drive;
    storing, when an instantaneous operating range of the drive and/or of the transportation device, corresponds to a predefined operating range, the sensor data as measuring sensor signals, which originate from sensors predefined for the predefined operating range;
    recognizing a defect of the drive when at least one of the measuring sensor signals deviates from a predefined standard sensor signal by a predefined degree;
    outputting a warning about a presence of the defect to a user of the transportation device;
    calculating a state parameter of the drive from a deviation between the measuring sensor signal and the standard sensor signal, the state parameter being a measure of a deviation of the state of the drive from a normal state; and
    classifying the measuring sensor signal, based on at least one predefined statistical code number, the calculation of the state parameter corresponding to a Mahalanobis distance between the statistical code number of the measuring sensor signals and the same statistical code number of the standard sensor signal;
    wherein the defect is recognized in the recognizing step when the state parameter exceeds a limiting value corresponding to the predefined degree.

11. The method as recited in claim 10, wherein the predefined statistical code number is a mean value and/or a standard deviation and/or a skewness and/or a kurtosis and/or a form parameter.

12. The method as recited in claim 10, wherein the predefined operating range and/or the predefined statistical code number is determined in advance by collecting test sensor data, which were detected using sensors at at least one defective drive, the predefined operating range and/or the predefined statistical code number enabling a maximal classification accuracy of the defect of the drive in the test sensor data.

13. The method as recited in claim 12, wherein the predefined operating range and/or the predefined statistical code number is determined separately in advance for different defects of the drive.

14. A non-transitory machine-readable memory medium, on which are stored sensor data and a computer program, which is executable by a processor, comprising:
- a program code arrangement having program code for ascertaining a state of an electric drive of a transportation device, by performing the following:
  - providing sensor data from sensors of the drive, the sensor data indicating parameters of the drive;
  - storing, when an instantaneous operating range of the drive and/or of the transportation device corresponds to a predefined operating range, the sensor data as measuring sensor signals, which originate from sensors predefined for the predefined operating range;
  - recognizing a defect of the drive when at least one of the measuring sensor signals deviates from a predefined standard sensor signal by a predefined degree;
  - outputting a warning about a presence of the defect to a user of the transportation device; and
  - classifying the measuring sensor signal, based on at least one predefined statistical code number;
  - wherein a calculation of a state parameter of the drive corresponds to a distance between the at least one predefined statistical code number of the measuring sensor signals and the same statistical code number of the standard sensor signal, and
  - wherein the distance is a Mahalanobis distance.

15. The machine-readable memory medium as recited in claim 14, wherein the state parameter is a measure of a deviation of the state of the drive from a normal state.

16. A bicycle, comprising:
- an electric drive, the electric drive including a control unit configured to ascertain a state of the electric drive of the bicycle, the control unit configured to perform the following:
  - providing sensor data from sensors of the drive, the sensor data indicating parameters of the drive;
  - storing, when an instantaneous operating range of the drive and/or of the transportation device corresponds to a predefined operating range, the sensor data as measuring sensor signals, which originate from sensors predefined for the predefined operating range;
  - recognizing a defect of the drive when at least one of the measuring sensor signals deviates from a predefined standard sensor signal by a predefined degree; and
  - outputting a warning about a presence of the defect to a user of the bicycle; and
  - classifying the measuring sensor signal, based on at least one predefined statistical code number;
  - wherein a calculation of a state parameter of the drive corresponds to a distance between the at least one predefined statistical code number of the measuring sensor signals and the same statistical code number of the standard sensor signal, and
  - wherein the distance is a Mahalanobis distance.

* * * * *